(12) United States Patent
Simon et al.

(10) Patent No.: US 6,733,663 B1
(45) Date of Patent: May 11, 2004

(54) WASTE WATER TREATMENT WASHER COMPACTOR SYSTEM

(75) Inventors: Richard D. Simon, San Rafael, CA (US); Michael Guthrie, San Rafael, CA (US)

(73) Assignee: Material Systems Engineers, San Rafael, CA (US)

( * ) Notice: Subject to any disclaimer, the term of this patent is extended or adjusted under 35 U.S.C. 154(b) by 104 days.

(21) Appl. No.: 10/211,863

(22) Filed: Aug. 1, 2002

Related U.S. Application Data

(60) Provisional application No. 60/309,656, filed on Aug. 1, 2001.

(51) Int. Cl.[7] .............................................. B01D 33/00
(52) U.S. Cl. ........................ 210/104; 210/155; 210/158; 210/159; 210/160; 134/104.4; 134/115 R; 100/147
(58) Field of Search ................................. 210/104, 143, 210/155, 158, 159, 160, 259, 391, 400, 411; 134/104.4, 115 R; 100/147

(56) References Cited

U.S. PATENT DOCUMENTS

| | | | | |
|---|---|---|---|---|
| 4,260,488 A | * | 4/1981 | Condolios | 100/147 |
| 4,518,494 A | * | 5/1985 | Jackson | 210/158 |
| 4,836,919 A | * | 6/1989 | Huber | 210/158 |
| 4,961,864 A | * | 10/1990 | Bruke | 210/159 |
| 5,102,536 A | * | 4/1992 | Wiesemann | 210/160 |
| 5,110,461 A | * | 5/1992 | Abel | 210/158 |
| 5,296,136 A | * | 3/1994 | Abel | 210/159 |
| 5,300,221 A | * | 4/1994 | Austevoll | 210/155 |
| 5,565,093 A | * | 10/1996 | Frankenberger | 210/158 |
| 5,993,651 A | * | 11/1999 | Wiesemann | 210/155 |

* cited by examiner

*Primary Examiner*—Christopher Upton
(74) *Attorney, Agent, or Firm*—Larry D. Johnson; Craig M. Stainbrook; Johnson & Stainbrook, LLP

(57) ABSTRACT

A wastewater treatment washer compactor system having in-channel motorized screen for installation in an influent channel and removal of screenings from the influent stream; at least one washer and at least one compactor for washing and dewatering the screenings; and system control means for coordinating and controlling the motor speed of the motorized screen, the washing cycle time and processing rate of the washer(s), and the compacting rate of the compactor(s).

14 Claims, 7 Drawing Sheets

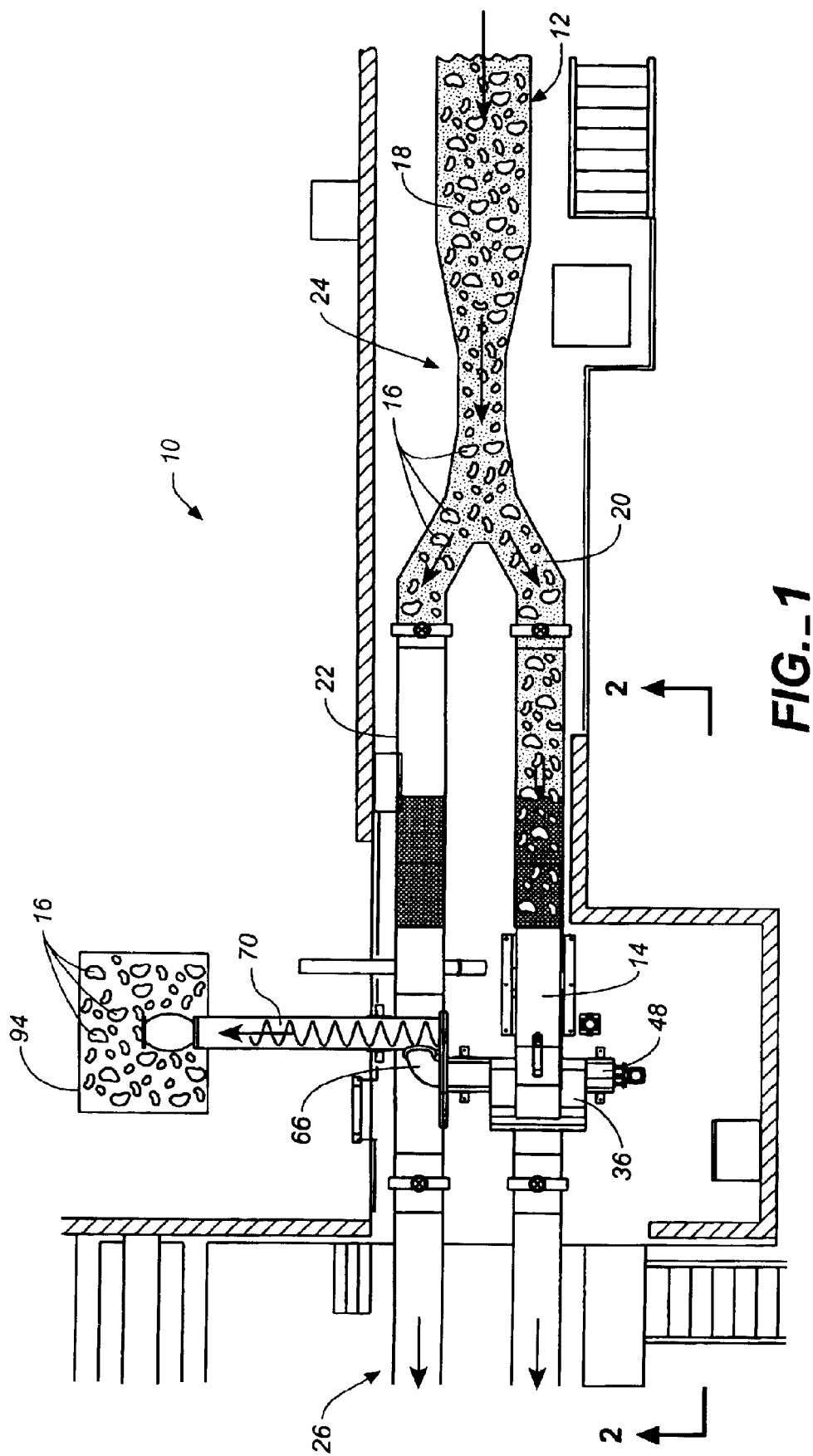
FIG._1

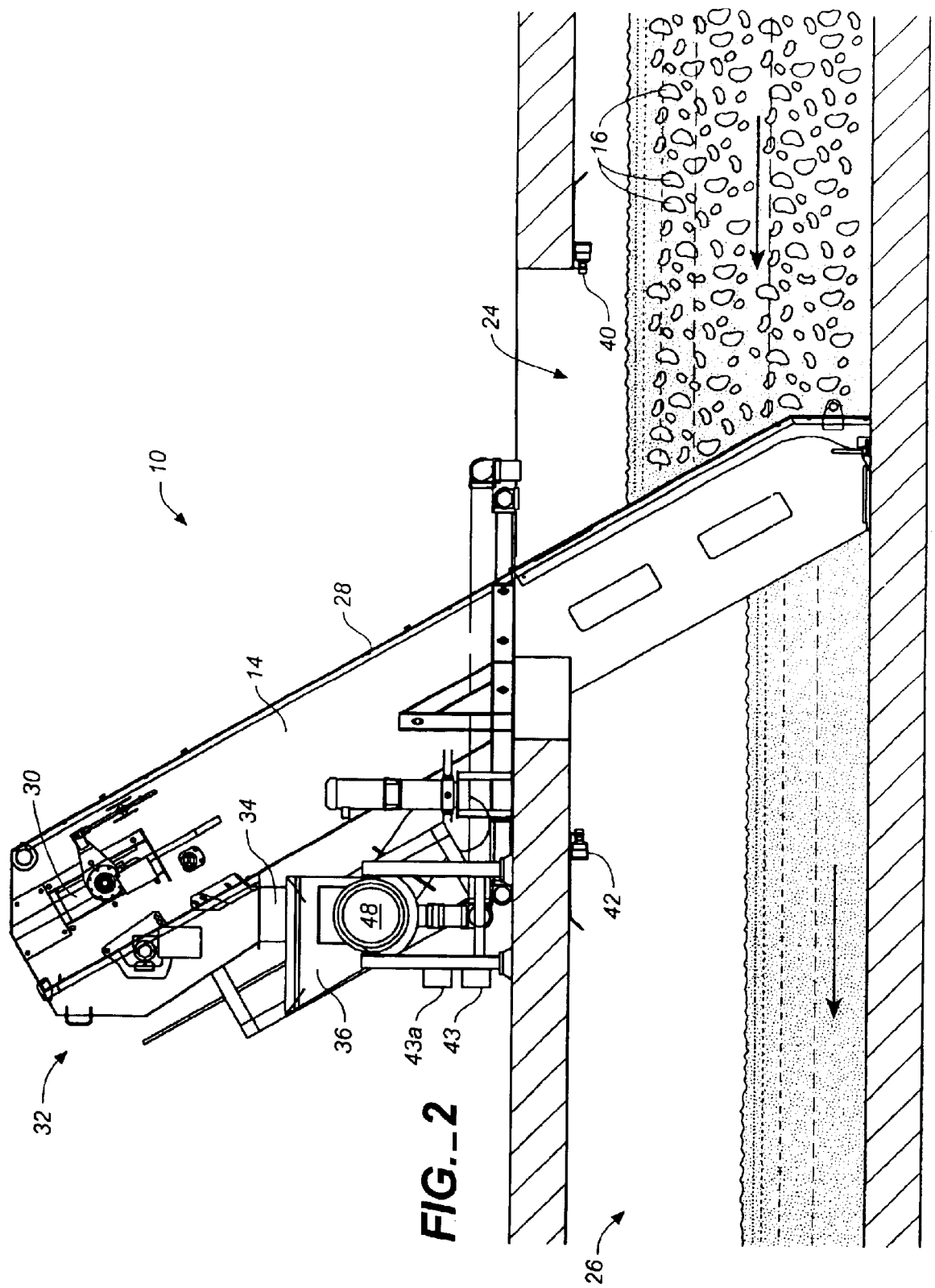
FIG._2

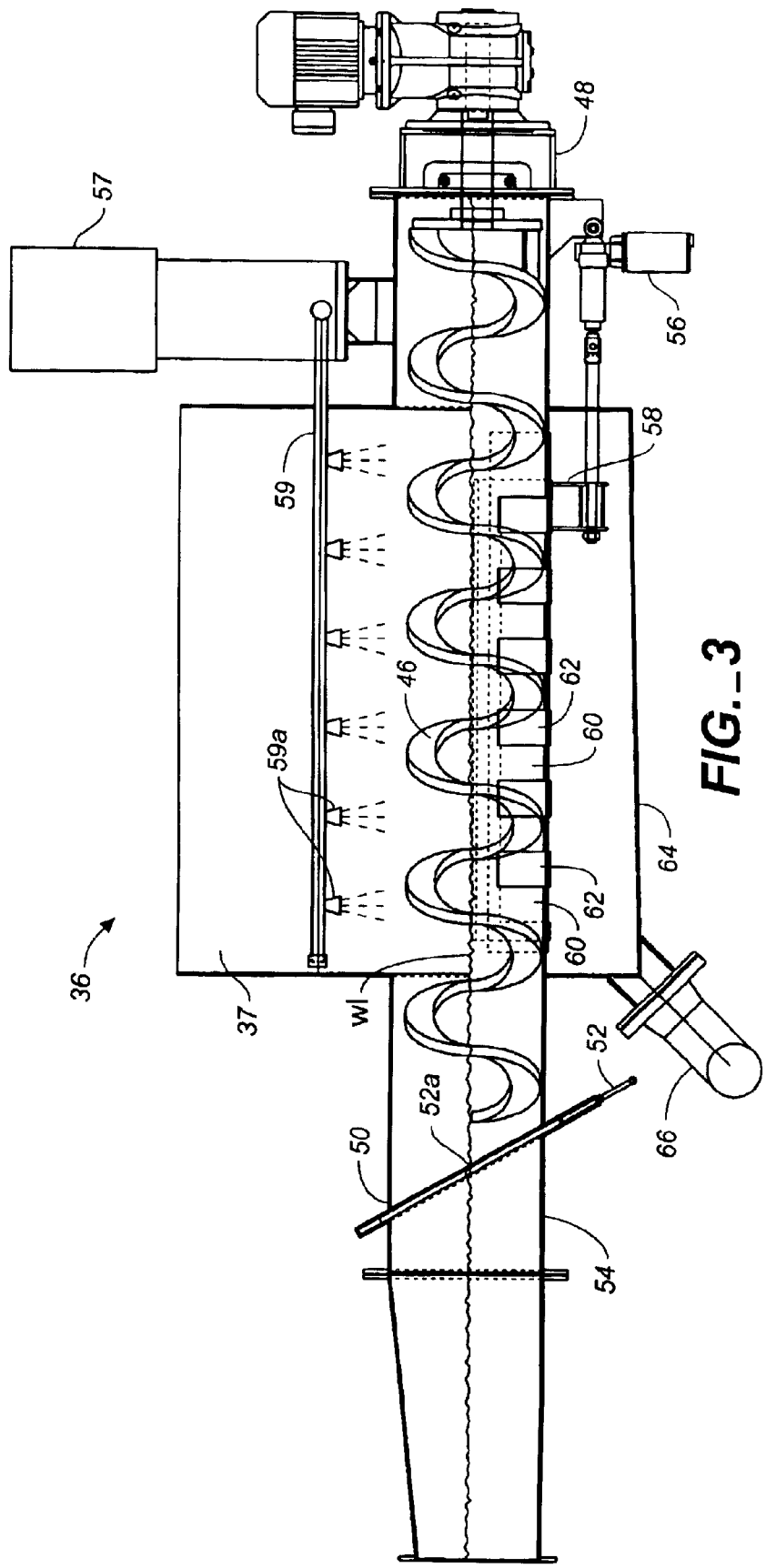
FIG._3

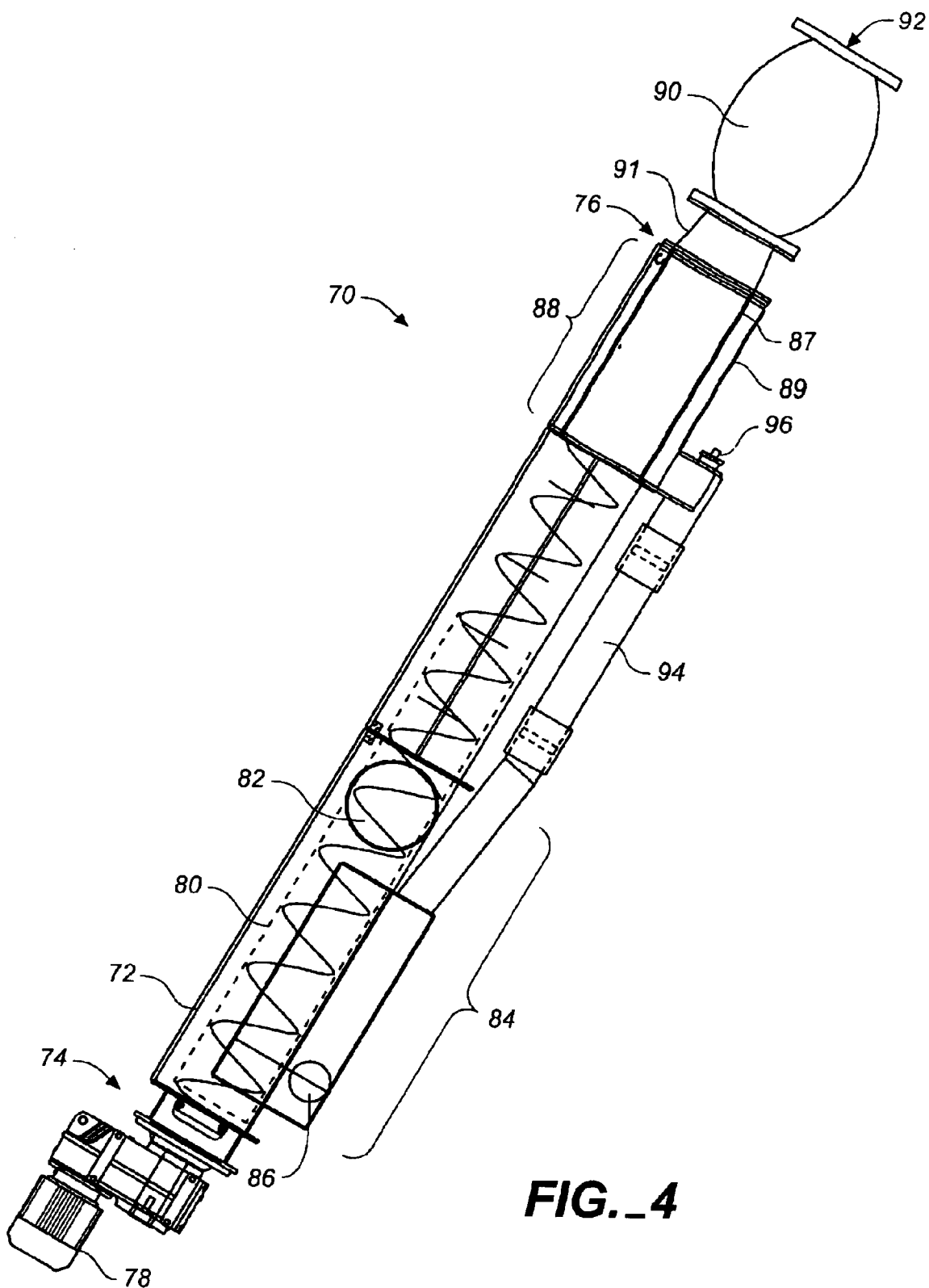
FIG._4

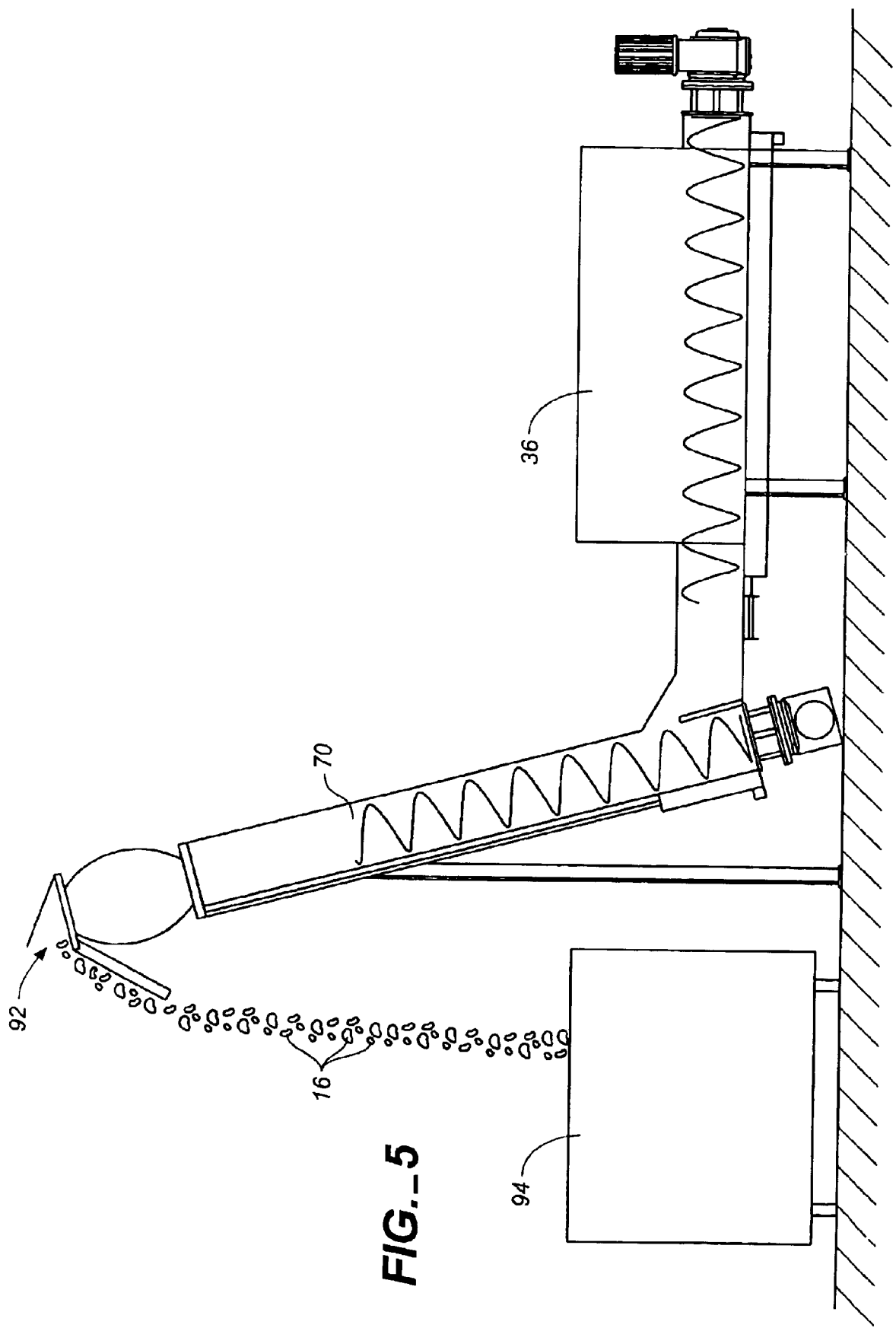
FIG._5

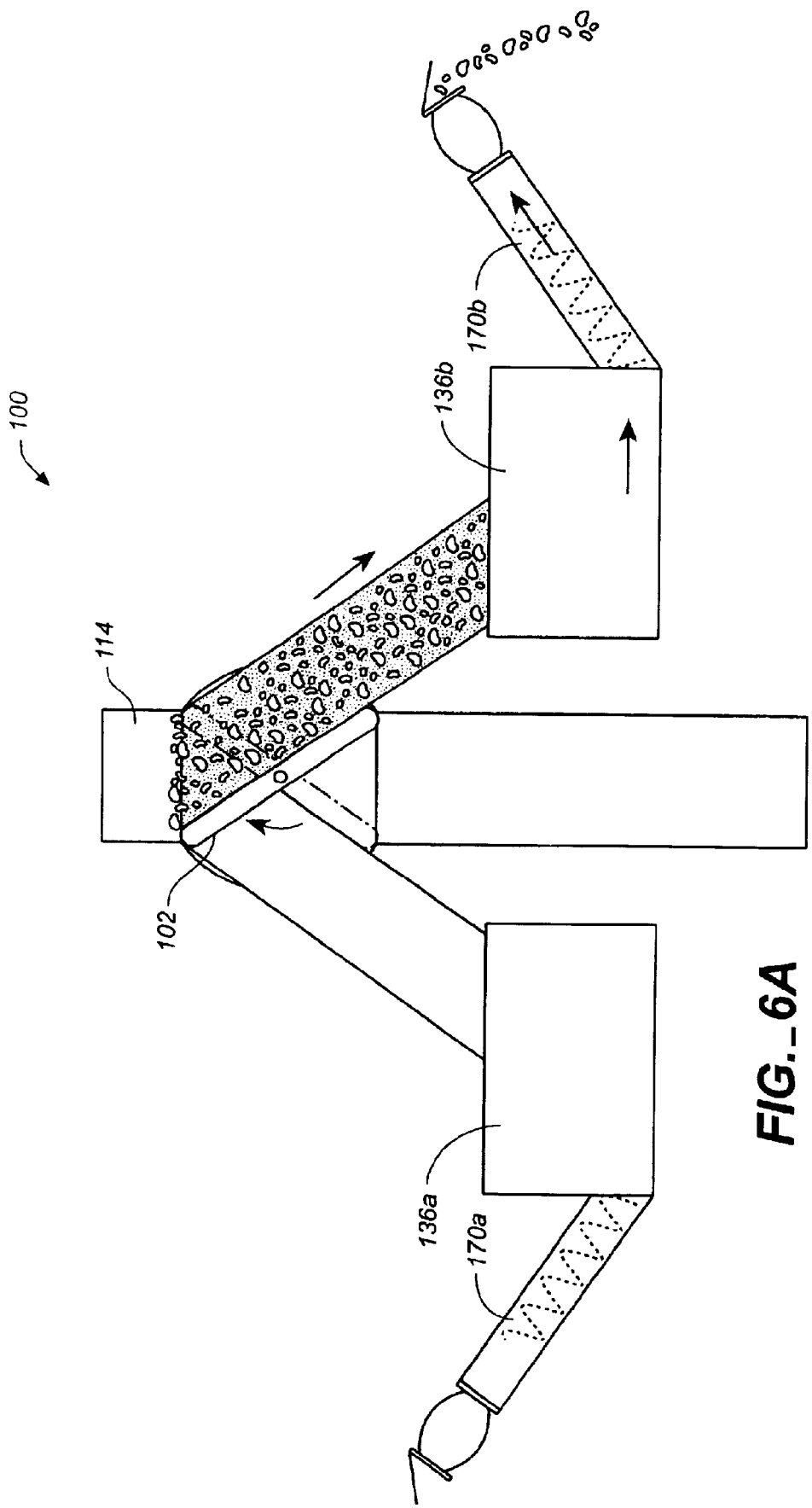
FIG._6A

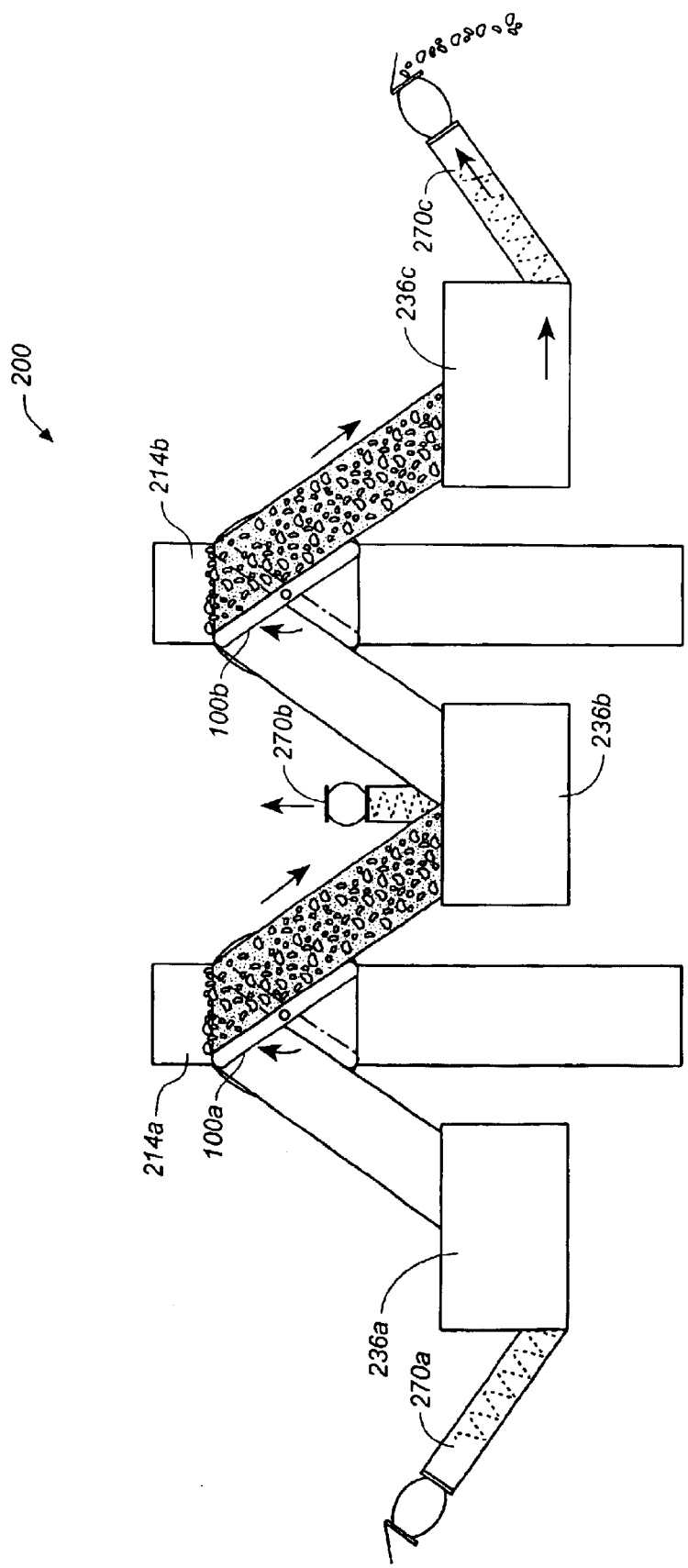
FIG._6B

WASTE WATER TREATMENT WASHER COMPACTOR SYSTEM

CROSS REFERENCE TO RELATED APPLICATIONS

The present application claims the benefit of the filing date of U.S. Provisional/Utility Application Serial No. U.S. Provisional Patent Application Serial No. 60/309,656, filed Aug. 1, 2001.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to wastewater screenings and filtering devices, and more particularly to a computer controlled washer/compactor apparatus that automatically and precisely controls the processing rate of collecting screenings from a wastewater stream, conveying the screenings into a washer and washing them of organic material, compacting and dewatering the screenings in a compactor, and finally conveying the dewatered screenings into a solid waste container for transport to a waste disposal site or treatment facility.

BACKGROUND INFORMATION AND DISCUSSION OF RELATED ART

An influent stream at a wastewater treatment plant contains all kinds of suspended and floating solid material (screenings): condoms, tampons, cigarettes, sticks and leaves, paper, and virtually every other small rubber, wood, and plastic consumer item manufactured by man. As they mix with sewage influent, the suspended solids become coated with dissolved or semidissolved organic material, including human and animal waste. A typical first phase in the treatment of waste water in a waste water treatment facility involves the separation and removal of such course screenings from the influent stream. The materials are captured on screens or racks having openings sized for the kinds of screenings in the environment. The captured screenings are then transported and treated in a variety of ways, generally involving washing and compacting the screenings and returning free captured water to the stream. The compacted screenings are then generally transported to a site for disposal either in the land, ocean, or atmosphere, or may be recycled or composted.

Barring mechanical problems, such operations customarily continue day and night without interruption. However, screenings volume and influent flow rate varies dramatically according to the type of waste flow, the season, weather conditions, local urbanization, and so forth.

The prior art reveals that systems currently in use have several limitations and are vulnerable under high load conditions. The prior art systems generally employ a combination washer/compactor with side-by-side screw press operations, or, alternatively, a screw press washer agitator alongside a hydraulic compactor. The systems are costly and prone to frequent mechanical breakdowns resulting in significant system downtime. Because an influent stream cannot be allowed to back up, this results in periodic ineffectual removal of waste solids from waste water treatment systems. Furthermore, when either one of the system components (washer or compactor) fails or requires maintenance, the entire system must be shut down. Further still, the combination washer/compactor systems limit placement options and usually entail location of the washer/compactor in proximity to a screenings conveyor or waste container. Finally, the prior art systems do not automatically control the processing rate for screenings when the flow rate of the influent stream is unusually high or low.

The waste water treatment system washer compactor of the present invention addresses these limitations in the prior art and provides a flexible, cost-effective solution that ensures continuous system operation.

BRIEF SUMMARY OF THE INVENTION

The waste water treatment system washer compactor of the present invention incorporates several novel features. Notably, the system includes level sensors positioned on the upstream and downstream side of the screen. The sensors are used to determine the difference in height of the water between the upstream and downstream sides of the in-channel screen. This difference is an indication of the capacity of the system to collect and process the screenings: a high level differential indicates the system is under strain and must increase processing speed or employ auxiliary units; a low level is an indication of efficient processing. A microprocessor or a PLC receives the signals produced by the level sensors and, in turn, generates an output signal to either slow or speed up the screen, the washers, and/or the compactor to ensure an optimum load on the system components. In multiple component systems, the system logic can also select among the system components where to deliver screenings for optimal processing efficiency. For instance in a system employing two washers and two compactors and a single in-channel screen, the system can identify a washer compactor combination in use or out of service and deliver screenings to the other combination.

Screenings captured by the in-channel screen are dumped into a washer where high pressure water (150 psi) is sprayed through an array of nozzles is used to break-up the fecal matter and other organic material while the solids are agitated and exposed to the pressure spray. In the case of the present invention, the agitation is effected by a shaftless screw. Unlike prior art designs, many with relatively low pressure spray apparatus, the present system includes a booster pump that boosts plant-supplied water to 150 psi, thereby ensuring effective impact cleaning of the screenings.

When the was cycle is complete, shaftless screw augers material into a discharge outlet and into a novel compactor, which comprises a second shaftless screw housed within a tube. Water is then drained from the washer by means of perforated plates at the bottom of the washer tank. A slide gate is opened to drain water from the tank and after draining is closed for filling. The gate has bristles that clean any solid material that may be caught in the perforations of the drain plate.

The compactor can be oriented horizontally or nearly vertically and can be up to 60 feet in length. As material is augured, it forms a plug in a dewatering box, where the pressure on the plug is maintained by a hydraulically or pneumatically operated pinch valve that will maintain a constant pressure on the screenings as water is "pressed" from the solids as it compacts. The pinch valve comprises a variable restrictive orifice which allows screenings to pass while simultaneously exerting sufficient pressure to foster the formation of a dewatering plug. Dewatered, compacted screenings are discharged through the pinch valve and into a suitable receptacle.

Unlike prior art systems, the present invention utilizes stand alone or discrete washer and compactor systems. This permits the systems to be positioned at multiple angles relative to one another and further permits removal and maintenance of the systems separately.

BRIEF DESCRIPTION OF THE SEVERAL VIEWS OF THE DRAWINGS

FIG. 1 is a top plan view of the waste water treatment system washer compactor of the present invention, shown installed in an influent channel;

FIG. 2 is aside view in elevation of the in-channel screen employed in the inventive system, particularly showing the installation of level sensors both upstream and downstream of the screen;

FIG. 3 is a side view in elevation of the washer apparatus of the present invention;

FIG. 4 is a side view in elevation of the compactor of the present invention;

FIG. 5 is a side view in elevation of the washer and compactor components of the inventive system, illustrating a dramatic vertical orientation of the compactor to best take advantage of gravity in compacting screenings and in separating free water from the screenings;

FIG. 6A is a schematic view of the inventive system utilizing two washer compactor combinations; and FIG. 6B is a schematic view of the system having three washer compactor combinations.

DETAILED DESCRIPTION OF THE INVENTION

Referring to FIGS. 1 through 6B, wherein like reference numerals refer to like components in the various views, FIG. 1 is a top plan view of the waste water treatment system washer compactor of the present invention 10, shown installed in an influent channel 12, and FIG. 2 is a side view in elevation of the in-channel screen. These views show that the system generally includes a motorized in-channel screen apparatus 14 adapted for removing screenings 16 from an influent stream 18. The channel may be divided into a screen side 20 and an open side 22 in cases where the removal of screenings must be terminated for any reason (e.g., system repair), or in cases where the system is simply overwhelmed by demand, for instance during high intensity storms. The stream may also be considered as having an upstream (preprocessing) side 24 and a downstream (post processing) side 26.

The screen apparatus extends to the bottom and to the sides of the channel, thus fully impeding water flow around its sides. Preferably, the screen or the in-channel screen environment is equipped with structure to direct water flow into a plurality of perforated or slotted stainless steel panels 28. The panel openings are generally from 5–10 mm in diameter. As is well known in the art, as water flows through the panels, suspended and floating solids are captured by the screen and conveyed upwardly by a chain or belt drive (not shown) operatively connected to a conveyor motor 30. The screenings are knocked off the panels by a brush shower comprising high pressure spray nozzles and brushes (not shown) near the upper portion 32 of the screen apparatus. The screenings fall into an enclosed chute 34 which funnels the screenings into a washer 36 having a tank 37 (see FIG. 3) that tapers inwardly to a smaller volume at its lower portion. Spray water is collected along with the screenings in the washer. An in-channel screen of the type described herein is available under the trade name AQUA-SCREEN, which is a trademark of the Andritz AG Corporation Austria.

FIG. 2 also shows the location of upstream and downstream level sensors, 40 and 42, respectively, connected to a microprocessor-based level monitor 43. A representative system well known in the art is the AiRanger DPL Plus. The system may utilize a two Milltronics ultrasonic transducers to monitor water level in the upstream and downstream channels. It may also be connected to a buffered interface converter, such as a Milltronics BIC-II, to provide RS-232 and/or RS-422 communications to a host computer, distributed control system, or a PLC 43a, which, in turn, will control the operation rate and cycle times of the system components, including the in-channel screen, the washer, and the compactor. As the upstream water level rises, due to increased influent flow or to increased volume of screenings temporarily blocking screen panel openings, the system logic will respond by increasing the travel rate of the screen conveyor. Then, as screenings drop into the washer or washers at an increased rate, the washer cycle is adjusted to process screenings more rapidly, as is the compactor cycle. In multiple component systems (see FIGS. 6A and 6B), the system logic will automatically select the washer compactor combination optimal for rapid processing and will direct the screenings accordingly, preferably through a selectively movable gate or slide.

After collection in the washer tank 36, the screenings are agitated by a shaftless screw 46 (see FIG. 3). The screw motor 48 includes forward and reverse directions and constantly agitates screenings throughout the wash cycle. Simultaneously, a plurality of high pressure spray nozzles in the upper portion of the washer tank continue to blast organic matter from screenings as they are elevated and agitated by the screw. A booster pump 57 increases plant-supplied water pressure to 150 psi and conducts the water through one or more horizontally disposed pipes 59 in the washer tank immediately above the washer augur. The pipes include an array of high pressure full cone spray nozzles 59a to provide complete spray coverage over the augur screw and the agitated screenings.

A weir 50 having level selection means 52 is positioned in an open washer discharge conduit 54 to prevent screenings from escaping during the wash cycle and maintains a selected water level WL.

When the wash cycle is completed, the screw is turned in the direction which pushes screenings away from the motor and into the washer discharge conduit. The screenings are pushed over the weir's median partition 52a and into the discharge conduit.

After the screenings are removed, a linear actuator 56 positioned below the washer tank, moves a gate 58 having a plurality of openings 60 complementary to openings 62 in the bottom of the washer tank. Wash water drains into a drain box 64 and through a downward sloping drain outlet 66 and back to the influent channel. The screenings are directed into the compactor 70 by gravity and by pressure from the ongoing operation of the washer augur.

FIG. 4 is a side view in elevation of the compactor of the present invention. This view shows that the compactor comprises an elongate housing 72 having an inlet or motor end 74 and a discharge end 76. Positioned on the motor drive end is a motor drive 78 operatively connected to a screw (not shown) which extends the length of a compactor screw portion 80 (in phantom) within the housing. Screenings discharged from the washer enter the compactor through inlet 82 where they are picked up by the forward movement of the screw flights. Because the compactor is generally angled upwardly from its motor drive end to its discharge end, remaining free water from the screenings will drain back into an inlet trough and drain portion 84 of the compactor and out lower drain 86, where it is diverted back into the downstream channel.

As the screenings are pushed and pressed upwardly within the compactor, aplug forms in the dewatering section 88 of the housing due to resistance to passing caused by a pinch valve 90 located at the discharge end of the housing. The pinch valve has an inner sleeve which pinches the screenings and permits a compacted plug of screenings to pass through outlet 92 only when a threshold pressure is reached. Valve throttling control resides in a changing pneumatic or hydraulic signal to an adjustable relay, which modulates pressure to the pinch valve. A fixed, proportion relay may also be employed. Pinch valves of this type are known in the art, a representative model being the Type A Control Valve available from Red Valve Company, Inc.

The dewatering section 88 also includes interior spray nozzles (not shown) to clean a cylindrical wedge-wire dewatering screen 87 concentrically interposed within the housing 89 around the dewatering section. The screen has a diameter that matches the interior diameter of the tapered pinch valve inlet 91. The compacting solid waste is pushed into the screen where the screenings shed much of their water, which drains into the space between the housing and the wedge-wire screen and then into clean out drain 94. Concurrently, water drains downwardly within and along the length of the compactor housing from the dewatering section to drain 86. At the discharge end of the forming plug, water drains from upper clean out drain 94 to lower drain 86. A spray nozzle 96 is positioned in the upper portion of clean out drain to push small sediment along and to keep water flowing down the drain.

FIG. 5 is a side view in elevation of the washer and compactor components of the inventive system, illustrating a dramatic vertical orientation of the compactor to best take advantage of gravity in compacting screenings and in separating free water from the screenings. This view shows, in the first instance, that screenings 18 pushed from compactor 70 through outlet 92 may be directed immediately into a collection box 94. Alternatively, the screenings may be dumped onto a conveyor in continuous operations.

In the second instance, FIG. 5 highlights the versatility of the inventive system relative to prior art washer/compactor combinations, which integrate the two systems into a unit with a fixed geometry. As will be readily appreciated, the orientation of the compactor in relation to the washer may be adapted to the environment in which it is installed and according to the dewatering characteristics desired. The washer discharge and any connecting pipes between the washer and compactor can be arranged in any of a number of suitable configurations as long as the flow of screenings is not unduly obstructed.

FIG. 6A is a schematic view of a multi-component system 100 utilizing two washer compactor assemblies 136a/170a and 136b/170b, served by a single in-channel screen 114 having a direction selecting ramp 102 controlled by the system logic according to the availability and processing efficiency of the components. It will be understood that in times of high flow or when components are undergoing maintenance or repair, screenings can be diverted to only the available washer/compactor assembly.

FIG. 6B is a schematic view of an alternative multi-component system 200 having three washer compactor combinations, 236a/270a, 236b/270b, and 236c/270c, served by two in-channel conveyor screens 214a and 214b. Referring again to FIG. 1, the second in-channel screen can be installed what would ordinarily be an open side 22, to ensure screening under all conditions. With a system of this type, continuous, uninterrupted operation is virtually assured through sheer redundancy and capacity.

Thus, in its most essential aspect, the present invention may be characterized as a wastewater treatment washer compactor system, comprising an in-channel motorized screen adapted for installation in an influent channel for removal of screenings from an influent stream, the motorized screen including a plurality of panels, each of the panels having openings, such as perforations or slots. The motorized screen has an upstream side and a downstream side. The system further includes at least one washer comprising a tank, an inlet chute to the tank, a motorized agitator disposed in the tank, and a discharge outlet. The motorized screen includes means for conveying and directing the screenings collected by the screen into the washer tank(s).

The system further includes at least one compactor having an inlet in communication with the discharge outlet of the washer. The compactor(s) include a housing having an inlet end and a discharge end, at least one water drain, and a variable orifice pinch valve disposed on the discharge end. The pinch valve includes an inlet, a deformable inner sleeve which selectively permits the discharge of compacted screenings when a preselected pressure is exerted on the inner sleeve, and a discharge orifice. Motorized compacting means move, compact, and dewater screenings within the during operation, said housing.

Finally, the system most essentially includes system control means for coordinating and controlling the motor speed of the motorized screen, the washing cycle time and processing rate of the washer(s), and the compacting rate of the compactor(s).

As noted previously, in the preferred embodiment of the present invention, the system control means preferably comprises water level sensors positioned on the upstream arid downstream sides of the motorized screen. The level sensors are adapted for detecting the water level of the influent channel on the upstream and downstream sides of the motorized screen. A water level monitor is in electronic communication with the level sensors, and a system control unit in electronic communication with the water level monitor controls the operation rate and cycle times of the motorized screen, the washer, and the compactor according to the water level differential of the influent stream on the upstream and the downstream sides of the motorized screen.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A wastewater treatment washer compactor system, comprising:
   an in-channel motorized screen adapted for installation in an influent channel for removal of screenings from an influent stream, said motorized screen having a plurality of panels, each of said panels having openings, wherein said motorized screen has an upstream side and a downstream side;
   at least one washer comprising a tank, an inlet chute to said tank, a motorized agitator disposed in said tank, and a discharge outlet from said tank;
   conveyance means for directing the screenings collected by said motorized screen into said washer tank(s);
   at least one compactor having an inlet in communication with said discharge outlet of said washer, said compactor(s) including a housing having an inlet end and a discharge end, at least one water drain, a variable orifice pinch valve disposed on said discharge end, said pinch valve having an inlet, a deformable inner sleeve which selectively permits the discharge of compacted screenings when a preselected pressure is exerted on said inner sleeve, and a discharge orifice, and motorized compacting means for moving, compacting, and dewatering screenings within said housing; and
   system control means for coordinating and controlling the motor speed of said motorized screen, the washing cycle time and processing rate of said washer(s), and the compacting rate of said compactor(s).

2. The waste water treatment washer compactor system of claim 1, wherein said system control means comprises water level sensors positioned on said upstream and downstream sides of said motorized screen and adapted for detecting the water level of the influent channel on said upstream and downstream sides of said motorized screen;
   a water level monitor in electronic communication with said level sensors; and
   a system control unit in electronic communication with said water level monitor;
   characterized in that said system control means controls the operation rate and cycle times of said motorized screen, said washer, and said compactor according to the water level differential of the influent stream on said upstream and said downstream sides of said motorized screen.

3. The waste water treatment washer compactor system of claim 2, wherein said system control is selected from the group consisting of a computer, a distributed control system, and a PLC.

4. The waste water treatment washer compactor system of claim 1, wherein said conveyance means comprises a brush shower including at least one high pressure spray nozzle, scrubbing brushes positioned proximate the upper portion of said screen apparatus, and a washer inlet chute into which the screenings are directed.

5. The waste water treatment washer compactor system of claim 1, wherein said motorized agitator in said washer comprises a shaftless augur screw.

6. The waste water treatment washer compactor system of claim 1, wherein said washer further includes a water pressure booster pump in fluid communication with a plurality of high pressure spray nozzles disposed above said washer agitator.

7. The waste water treatment washer compactor system of claim 1, wherein said washer discharge outlet includes a weir having level selection means, said weir preventing screenings from escaping from said washer tank during a wash cycle and for maintaining a selected water level in said tank during a wash cycle.

8. The waste water treatment washer compactor system of claim 1, wherein said washer tank includes a linear actuator positioned below said washer tank, said actuator in operative connection to a movable gate having a plurality of openings which are complementary to and may be aligned with openings in the bottom side of said washer tank.

9. The waste water treatment washer compactor system of claim 1, wherein said compactor housing is substantially cylindrical and elongate.

10. The waste water treatment washer compactor system of claim 1, wherein said compactor is angled upwardly from said inlet end to said discharge end.

11. The waste water treatment washer compactor system of claim 1, wherein said pinch valve includes throttle control comprising a changing pneumatic or hydraulic signal to an adjustable relay that modulates pressure to said pinch valve.

12. The waste water treatment washer compactor system of claim 1, wherein said compactor housing includes a dewatering portion having a dewatering screen with a diameter matching the diameter of said pinch valve inlet, and a water drain.

13. The waste water treatment washer compactor system of claim 1, wherein said system includes one motorized screen, two of said washers, and two of said compactors.

14. The waste water treatment washer compactor system of claim 1, wherein said system includes two motorized screens, three of said washers, and three of said compactors.

* * * * *